July 14, 1964 B. WERNER 3,140,639
TURRET PLATFORM FOR A REVOLVING-TURRET GUN MOUNTING
Filed June 3, 1963 3 Sheets-Sheet 2
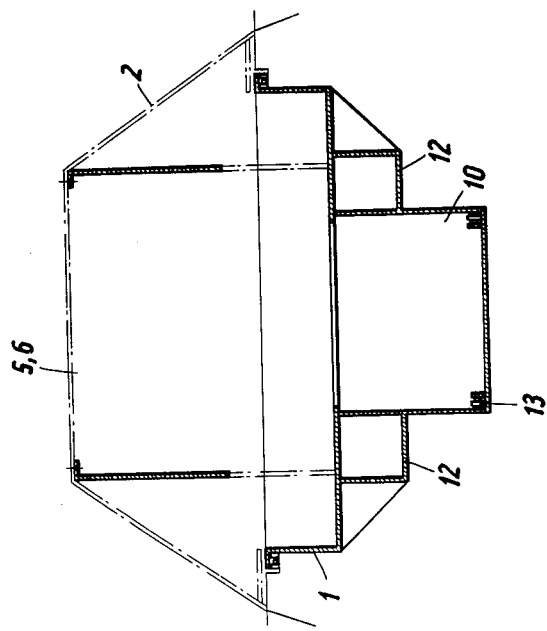
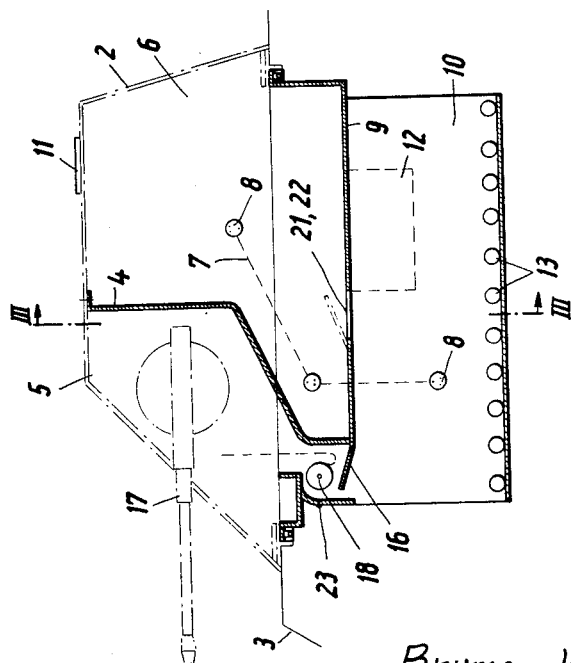
Inventor:
Bruno Werner
By
Watson, Cole, Grindle + Watson
Attys.

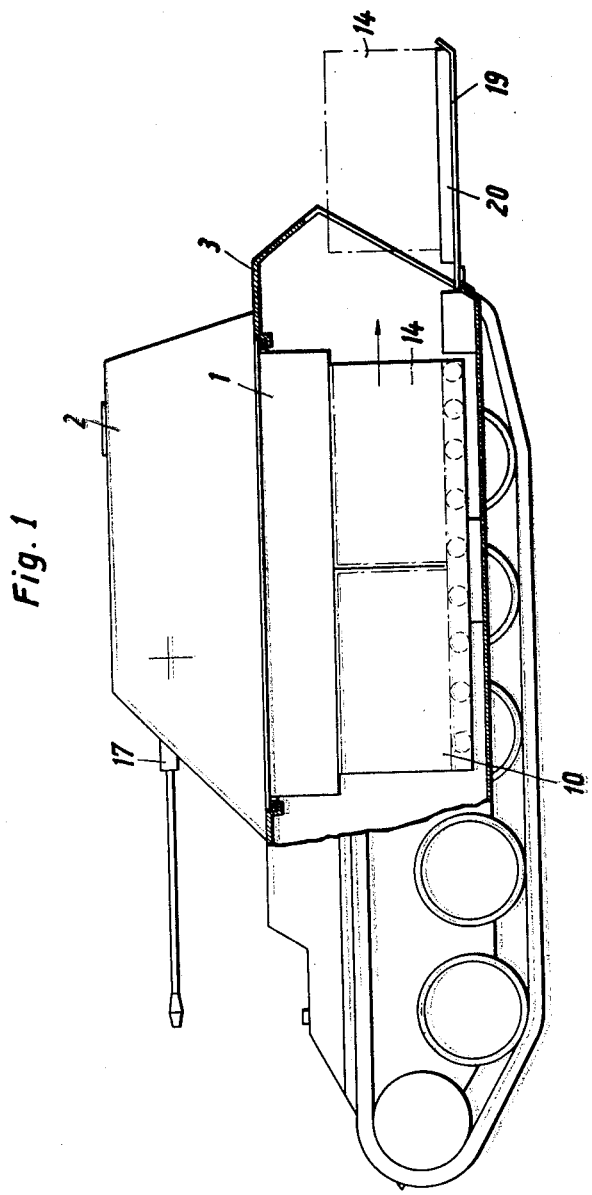

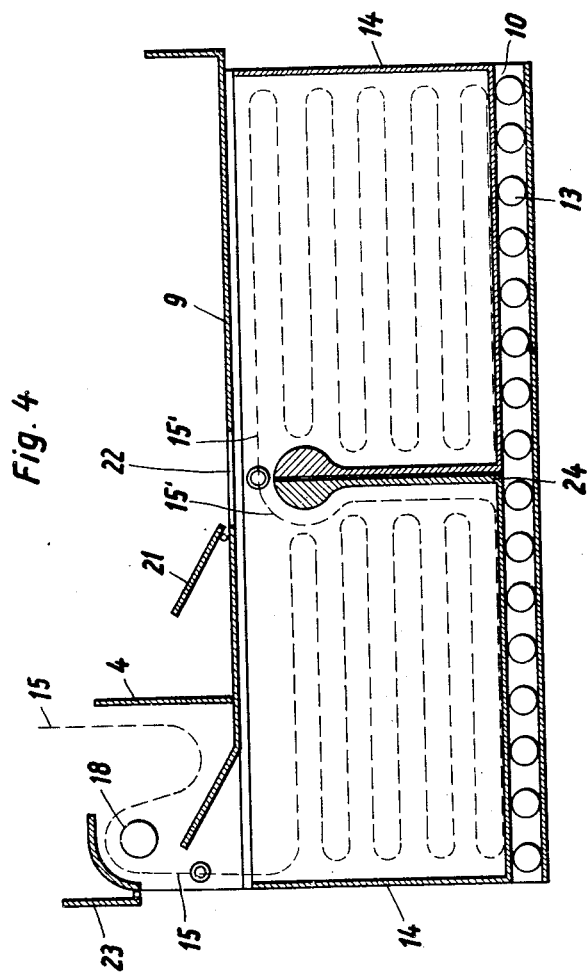

3,140,639
TURRET PLATFORM FOR A REVOLVING-TURRET GUN MOUNTING
Bruno Werner, Dusseldorf-Gerresheim, Germany, assignor to Firma Rheinmetall G.m.b.H., Dusseldorf, Germany
Filed June 3, 1963, Ser. No. 284,867
Claims priority, application Germany June 1, 1962
5 Claims. (Cl. 89—36)

This invention relates to turret platforms for revolving-turret gun mountings and in particular to those equipped with automatic weapons. In the known mountings of that kind, with which, for example, armoured vehicles are equipped, the space below the armoured cupola and referred to as the turret platform, serves to accommodate both the turret crew and the whole of the fighting equipment.

It is true that special compartments are provided within the mounting for the storage of ammunition, but the supply of ammunition to the weapons is generally carried out within the turret platform. The optimum utilization of the space present between the turret driving mechanism and the armoured cupola requires a generally polygonal shape for known turret platforms, whose walls, roofs and floors, which consist of steel plates, are connected to one another by means of welded and/or brazed joints, rivets and/or bolts. Apart from the fact that extremely great expense in mechanical working and assembly is inherent in such a method of manufacture, the high weight of the turret platform also requires the use of a driving source of considerable power with the consequent high consumption of energy.

The invention consists in that the turret platform takes the form of a self-supporting, approximately cup-like structural part made of a plastics material which is connected to the revolving-turret gun mounting and mounted rotatably together with the latter in the bed of the said structural part. In this way, the armoured cupola, as gun mounting proper, and the turret platform, as the support for all the other articles of equipment, form two structural parts which can be produced independently of one another and are bolted together to constitute the revolving-turret gun mounting.

In this way, not only is a reduction of weight achieved, but a number of other important advantages are also obtained which, on the one hand, are due to a substantially more economic method of production and, on the other hand, to the special shock-absorbing and vibration-damping properties of the plastics material, which is particularly important when it is necessary to mount sensitive electronic control gear in the turret. Furthermore, the electric installation of the turret can be substantially simplified by moulding cable shafts or conduits and even the cables themselves into the walls of the turret. Moreover, the turret platform can be divided in a very advantageous manner into a plurality of functionally specific compartments by moulding partition walls or bulkheads.

A further problem found in existing turret platforms is due, in fact, to powder gases issuing from the weapon breech. Such gases have a harmful effect on the health and the efficiency of the crew. There has also been, in the past, danger of impairment or loss of the fighting power of a vehicle crew operating in contaminated terrain due to the entry into the turret of contaminated gas through the large number of apertures present in the walls and wall connections of the turret platform.

Such problems are overcome in one embodiment of the invention by providing the turret platform with a moulded-in wall which is sealed to the wall of the revolving turret to form a shielded compartment for the gunners. In this way, a compartment for the gunners which is separate and sealed-off from the weapons is formed within the turret platform.

Preferably, a substantially U-shaped ammunition store open at the ends and having a substantially rectangular base surface is provided in a diametral position below the floor of the turret platform. The U-shaped walls of the ammunition store give the turret platform great rigidity. Furthermore, the ammunition store open at the ends can serve as an assembly shaft from which the revolving turret can be bolted with its ring mount to the bed of the turret, since every bolt in the bed is accessible to the mechanic when the turret is rotated through 360°. In this way, the maximum possible utilization of space is achieved. This has a particularly advantageous effect in the case of revolving-turret gun mountings installed in armoured vehicles. In these mountings, in fact, the turning space for the turret generally cannot occupy the entire width of the vehicle, since the turret platform located in the interior of the vehicle is as a rule not accessible from two sides of the vehicle. Sufficient space must therefore be left between the turret platform and the wall of the vehicle for a mechanic to be able to crawl through in order to bolt the turret to the bed.

A further construction embodying the invention renders possible further extremely advantageous developments. Thus, for example, the floor of the turret platform can have two openings in the region of the ammunition store. One of the openings is arranged in the region of a weapon compartment located in front of the gunners' compartment and the other in the region of the gunners' compartment. The first opening serves for supplying the ammunition, which is generally belted for automatic weapons, while the second opening makes it possible to couple individual belt lengths together from within the gunners' compartment.

As a further development of the invention, economic production is aided to a considerable extent if wells open at the ends for accommodating the driving mechanism for the revolving-turret gun mounting are arranged laterally of the ammunition store below the floor of the turret platform. The driving mechanism can be housed in these walls as independent structural units. At the same time, it is moreover advantageous for electric wiring to be moulded into the plastic walls of the turret platform and provided with suitable plug-in connections.

An embodiment of the invention will now be described in greater detail with reference to the accompanying drawings of which:

FIG. 1 shows an armoured vehicle with a revolving-turret gun mounting installed therein, FIG. 2 is a longitudinal section of the turret platform, FIG. 3 is a cross-section of the later on the line III—III, and FIG. 4 shows an ammunition store arranged below the turret platform.

A turret platform 1 forms part of a revolving-turret gun mounting and is bolted at its upper edge to an armoured cupola 2 both components being mounted rotatably in the bed of the vehicle frame. The turret platform 1 is made from a plastics material and may be produced, for example, by a process already employed with success for boat hulls in which the plastics material is sprayed on to a shaping mould to build up an appropriate wall thickness and is then separated from the mould after it has set. At the same time, the walls may be reinforced and consolidated if required by inserting mesh netting, glass fibre or other reinforcing material.

By means of an intermediate or partition wall 4 moulded into the turret platform and which is sealed to the armoured cupola, a weapon compartment 5 and a gunners' compartment 6 separated therefrom in gas-tight fashion are formed below the cupola. Because of this, the gases formed on firing are confined exclusively to the weapon compartment 5, while the gunners' compartment 6 located behind the latter and which, as is known, can be reached through the turret hatch 11, is sealed off hermetically from the outside air, so that the crew can also operate with the vehicle in terrain where the air is contaminated. Furthermore, electric wiring 7 and plug-in connections 8 required for the drive of the revolving-turret gun mounting and for operating the weapons and sighting devices are likewise let into the walls during the production of the turret platform. Below the floor 9 of the turret platform there is arranged a diametrically extending and substantially box-shaped ammunition store 10. The ammunition store has a rectangular base surface and is open at its ends. Furthermore, wells 12 are provided laterally of the ammunition store below the turret platform and serve to accommodate the driving mechanism of the revolving-turret gun mounting and the weapons. In this way, very simple and rapid assembly is possible since individual units of the driving mechanism are simply connected to the plug-in connections 8 by means of short cables.

Great rigidity of the turret platform is obtained because of the moulded-in walls and the side walls of the ammunition store, so that the turret platform forms a self-supporting structural part.

Advantageously, the floor of the ammunition store is equipped with rollers 13 of a plastics material for supporting ammunition holders 14 in which the belted ammunition 15 is contained so that the holders can be moved with ease longitudinally. Ammunition is supplied through an opening 16 located in the region of the weapon chamber 5 in the floor of the turret platform to the weapon 17 by means of a conveyor 18. In the rear wall of the armoured vehicle there is a pivotally mounted trap door 19 on which slide rails 20 are mounted. When the door has been swung out, as shown in FIG. 1, the slide rails are at the same height as the rollers 13, so that that ammunition holder which is nearest to the door can be pulled relatively easily on to the plate so that it can be filled with fresh ammunition. The other holder can also be filled in the same way, for which purpose the turret is first swung through 180°. The individual belt lengths 15' contained in the holders 14 can be coupled, in very simple manner, from the gunners' compartment 6 through a hatch 22. The hatch can be closed by a trap 21. In this way it is possible, if required, to fire the entire supply of ammunition in a single burst.

The two adjacent end walls 24 of the ammunition holders are made somewhat shorter than the outer walls and are given a bulbous formation at their upper ends. As a result, unimpeded movement of the belts over the end walls is obtained. The belt-conveying arrangement 18 is very easily accessible through a cover 23.

The supply of ammunition through the rear trap 19 is likewise of considerable advantage since it has heretofore been necessary to bring the ammunition into the turret platform through the turret hatch generally in relatively small containers.

I claim:

1. A revolving gun turret comprising a turret platform consisting of a self-supporting structure of cup-like form composed of a plastic material, a dividing wall formed integrally with said platform, a cupola secured to said platform, means for sealing said dividing wall to said cupola whereby the turret is divided into a weapon compartment and a crew compartment, and an open-ended box-shaped ammunition store secured and composed of a plastic material beneath said platform.

2. A revolving gun turret according to claim 1, in which an ammunition holder is provided in the store and in which rollers are provided for the ammunition store mounted on a floor of said ammunition store.

3. A revolving gun turret according to claim 1, in which the ammunition store is a self-supporting structure, open-ended and formed integrally with said platform.

4. A revolving gun turret according to claim 1, in which compartments are provided formed on the underside of the platform for accommodating driving mechanism for the turret.

5. A revolving gun turret according to claim 1, in which two access openings are provided in the region of said ammunition store, one of said openings being arranged in a weapon compartment and the other opening being located in the crew compartment.

References Cited in the file of this patent

UNITED STATES PATENTS

| | | |
|---|---|---|
| 2,712,271 | Wabnitz | July 5, 1955 |
| 2,933,981 | Anderson et al. | Apr. 26, 1960 |

FOREIGN PATENTS

| | | |
|---|---|---|
| 358,718 | Switzerland | Jan. 15, 1962 |